(12) United States Patent
Frenkel et al.

(10) Patent No.: US 6,379,711 B1
(45) Date of Patent: Apr. 30, 2002

(54) PHOSPHOMOLYBDIC ACID STABILIZER FOR HYDROGEN PEROXIDE

(75) Inventors: Peter Frenkel; Ted M. Pettijohn, both of Longview, TX (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/493,163

(22) Filed: Jan. 27, 2000

Related U.S. Application Data

(60) Provisional application No. 60/118,944, filed on Feb. 5, 1999.

(51) Int. Cl.[7] ......................... A01N 59/00; A01N 59/26; A01N 59/16; C01B 15/037; C01B 15/01
(52) U.S. Cl. .................. 424/616; 424/601; 424/606; 514/970; 423/272; 423/273; 423/584; 252/186.28
(58) Field of Search ..................... 424/616, 601, 424/606; 514/970; 423/272, 273, 584; 252/186.28

(56) References Cited

U.S. PATENT DOCUMENTS

| | | | |
|---|---|---|---|
| 2,982,799 A | 5/1961 | Klinkenberg | 585/529 |
| 3,607,053 A | 9/1971 | Reilly | 423/272 |
| 4,017,527 A | 4/1977 | Merkl | 556/182 |
| 4,568,775 A | 2/1986 | Aoshima et al. | 568/617 |
| 4,666,993 A | 5/1987 | Urano et al. | 525/328.2 |
| 4,898,987 A | 2/1990 | Knifton | 568/385 |
| 4,952,712 A | 8/1990 | Orita et al. | 552/307 |
| 4,981,662 A | 1/1991 | Dougherty | 423/272 |
| 5,030,767 A | 7/1991 | Yorozu et al. | 568/568 |
| 5,068,455 A | 11/1991 | Yorozu et al. | 568/567 |
| 5,320,821 A | 6/1994 | Nagashima et al. | 423/584 |
| 5,436,313 A | 7/1995 | Klang et al. | 528/274 |
| 5,470,932 A | 11/1995 | Jinkerson | 526/312 |
| 5,488,178 A | 1/1996 | Knifton et al. | 568/578 |
| 5,510,516 A | 4/1996 | Caubere et al. | 560/220 |
| 5,525,704 A | 6/1996 | Tamai et al. | 528/423 |
| 5,608,030 A | 3/1997 | Hoffmockel et al. | 528/232 |
| 5,608,089 A | 3/1997 | Sato et al. | 549/531 |
| 5,653,910 A * | 8/1997 | Kerschner et al. | 252/186.33 |
| 5,705,685 A | 1/1998 | Lyons et al. | 562/549 |
| 5,716,895 A | 2/1998 | Sugi et al. | 502/24 |
| 5,719,304 A | 2/1998 | Frenkel et al. | 558/264 |
| 5,900,256 A * | 5/1999 | Scoville, Jr. et al. | 424/616 |

FOREIGN PATENT DOCUMENTS

| | | |
|---|---|---|
| EP | 0 325 032 A1 | 7/1989 |
| EP | 0 675 146 A1 | 10/1995 |
| WO | 95/04099 | 2/1995 |

OTHER PUBLICATIONS

Chemical Abstracts 115:279181, 1991.*
Chemical Abstracts 105:12857, 1986.*
Wu, Yue et al., "Catalytic behaviour of metal ions located at different sites of heteropolycompounds,", *Catalysis Letters*, 23:195–205 (1994).
Abstract of Tianxi, Cai et al., "Selective Oligomerization of Isobutene in C4 Mixture Using Heteropolyacids as Catalysts," *Petrochemical Technology (Shiyou Huagong)*, 15:212–213 (Apr. 1986).
Shengyun, Pan et al., "A Study on Propene Oligomerization on the Heteropolyacids Catalysts," *Chemical Reaction Engineering and Technology*, 11:8–12 (Mar. 1995).
Vaughan, J. S. et al., "High–Pressure Oligomerization of Propene over Heteropoly Acids," *Journal of Catalysis*, 147:441–454 (1994).
Bednarek, Melania et al., "Heteropolyacids—new efficient initiators of cationic polymerization,", *Makromol. Chem.*, 190:929–938 (1989).
Pope, Michael T. et al., "Polyoxometatate Chemistry: An Old Field with New Dimensions in Several Disciplines," *Angew. Chem. Int. Ed. Engl.*, 30:34–48 (1991).
Bianchi, Maria L. et al., "Bleaching of commercial pulps with H2O2 catalyzed by heteropolyacids," *Bioresource Technology*, 68:17–21 (1999).
Abstract Accession No. 122:65498 CA (1994) to Qi, et al., *Gaodena Xuexiao Huaxue Xuebao* 15(9):1357–1360.
Abstract Accession No. 125:97012 CA (1996) to Shan, et al., *Fenzi Cuihua* 10(2):127–134.
Abstract Accession No. 125:124737 CA (1996) to Shan, et al., *Gaodeng Xuexiao Huaxue Xuebao* 17 (4):613–617.

* cited by examiner

*Primary Examiner*—John Pak
(74) *Attorney, Agent, or Firm*—Daniel Reitenbach

(57) ABSTRACT

Phosphomolybdic acid and partial alkali salts of phosphomolybdic acid are used as stabilizers for aqueous hydrogen peroxide.

6 Claims, No Drawings

PHOSPHOMOLYBDIC ACID STABILIZER FOR HYDROGEN PEROXIDE

CROSS-REFERENCE TO RELATED APPLICATIONS

This application is a utility application claiming priority from provisional application No. 60/118,944, filed Feb. 5, 1999, the contents of which are hereby incorporated by reference.

BACKGROUND OF THE INVENTION

Hydrogen peroxide is a widely used oxidant. Although concentrated solutions of hydrogen peroxide are stable, diluted hydrogen peroxide solutions with even trace levels of impurities present tend to degrade significantly during storage or use. Possible causes of the degradation include exposure to heat and radiation, contact with various types of container surfaces and interaction with catalytically active contaminants of the solutions such as transition metals. In particular, the presence of trace amounts of impurities such as iron, copper and other heavy metals can render the solutions unstable resulting in the decomposition of the hydrogen peroxide into water and oxygen during storage or use.

Because of the instability of diluted solutions of hydrogen peroxide, it is desirable to stabilize the hydrogen peroxide to be resistant to in situ oxidation and to form solutions stable toward dilution. It is further desirable for the stabilizer to be effective under acidic conditions.

A number of inhibitors are commonly used in an attempt to stabilize hydrogen peroxide against decomposition. Although organic inhibitors such as acetanilide may be used, they are subject to oxidation by the hydrogen peroxide where hydrogen peroxide is present in high concentrations, thereby significantly reducing the stabilization effect over time.

Tin compounds have long been known as effective stabilizers for hydrogen peroxide. Typical tin compound stabilizers are alkali-metal stannates, such as sodium stannate, which form a tin (IV) oxide sol dissolved in $H_2O_2$. The sol is usually co-stabilized by a peptizing agent such as a phosphate or phosphoric acid. Many other organic and inorganic acids are known to be effective co-stabilizers. Among these are benzoic acid, sulfuric acid, nitric acid, sulphonic acids, sulphamic acids, ethylenediaminetetraacetic acid, lactic acid, citric acid and the like.

Tin compounds such as sodium stannate have known toxicity effects. It is desirable, therefore, to provide compounds for the stabilization of hydrogen peroxide which are not tin based.

Phosphomolybdic acid (PMA) has been described as a stabilizer for certain organic peroxide compositions in U.S. Pat. No. 5,719,304. However, in hydrogen peroxide solutions, PMA has previously been reported as a catalyst for hydrogen peroxide reactions. U.S. Pat. No. 4,952,712, for example, discloses the use of PMA as a catalyst in the reaction of hydrogen peroxide with a trimethoxytoluene. U.S. Pat. No. 5,030,767 discloses the use of PMA as a catalyst in the reaction of hydrogen peroxide with a substituted phenol. The use of heteropolyacids containing molybdenum as a catalyst for reactions involving hydrogen peroxide has also been disclosed in U.S. Pat. No. 5,608,089. In view of this catalytic action, it would not have been expected that PMA could be an effective stabilizer of hydrogen peroxide solutions.

All US patents and all other published documents mentioned anywhere in this application are incorporated herein by reference in their entirety.

BRIEF SUMMARY OF THE INVENTION

It has been discovered that phosphomolybdic acid (PMA) and closely related compounds may be used as a stabilizer for hydrogen peroxide solutions. In addition to PMA, partial alkali salts of PMA can be used to decrease the rate of decomposition of hydrogen peroxide.

One aspect of the invention is a hydrogen peroxide composition including a quantity of PMA compounds effective to retard the rate of decomposition of the hydrogen peroxide component. Another aspect of the invention is a method of stabilizing aqueous hydrogen peroxide by adding an effective amount of a PMA compound to the aqueous hydrogen peroxide to stabilize the hydrogen peroxide against decomposition.

Compositions of the invention may be more reactive for oxidation reactions than non-stabilized $H_2O_2$. Use of stabilized compositions of the invention in such reactions is a further aspect of the invention.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

The present invention relates to compositions containing aqueous hydrogen peroxide and phosphomolybdic acid, and/or partial alkali salts of phosphomolybdic acid to retard the rate of decomposition of the aqueous hydrogen peroxide.

Phosphomolybdic acid is a term which refers to any of several acidic compounds of phosphorus, molybdenum, oxygen and hydrogen. Without intending to be bound by any particular molecular structure or mode of synthesis, phosphomolybdic acid can be depicted by the formulas $H_3PMo_mO_x$ or $H_3PO_{4x}tMoO_{3x}dMoO_2$ wherein m (which equals (t+d)) is typically 10 to 20 but may be higher than 20 or less than 10, and x is typically 34 to 65 but may be higher than 65 or less than 34, and d may be zero. Preferred phosphomolybdic acid for use in the present invention includes compounds corresponding to the formulas $H_3PMo_{12}O_{40}$(CAS Registry Nos. 12026-57-2 and 51429-74-4, also known by $P_2O_{5x}20MoO_{3x}xM_2O$); $H_3PMo_{12}O_{39}$ (CAS Registry No. 99570-13-5); $H_3PMo_{12}O_{38}$(CAS Registry No. 99559-64-5); and $H_3PMo_{10}O_{34}$(CAS Registry No. 12519-76-5). Other phosphomolybdic acids corresponding to these formulas are also contemplated within the present invention. Phosphomolybdic acid is usually associated with up to about 60 moles of water of hydration per mole of phosphomolybdic acid.

Partial alkali salts of PMA include PMA in which some of the protons are substituted with lithium, sodium, potassium, rubidium or cesium and can be depicted by the formula $H_{3-y}M_yPMo_nO_x$ where $0<y<3$, M=Li, Na, K, Rb, Cs and combinations thereof, n is 10 to 20, and x is defined above. Desirably $0<y\leq2.5$. Stabilized compositions may be prepared by either dissolving solid PMA in aqueous hydrogen peroxide or by combining corresponding aqueous solutions of PIVA and hydrogen peroxide.

In addition to PMA, partial alkali salts of PMA may be used to stabilize solutions of hydrogen peroxide.

Desirably, the concentration of PMA and/or partial alkali salt of PMA in aqueous hydrogen peroxide solution will range from about 0.1 to about 2000 mg/L. More desirably, the concentration will range from about 1 to about 500 mg/L. Most desirably, the concentration will range from about 5 to about 50 mg/L. The exact amount of PMA and/or partial alkali salt of PMA to add will vary and depend on the purity of the aqueous hydrogen peroxide, and on the conditions to which the hydrogen peroxide will be exposed.

The composition may also contain other additives which are stable in the presence of hydrogen peroxide including nitric acid and phthalic acid. Conventional stabilizers, as are known in the art, may also be present.

The invention is illustrated by the following non-limiting examples.

EXAMPLES

The stabilizing effect of PMA on the hydrogen peroxide solutions is demonstrated by Examples 1–8 presented below and summarized in Table 1.

The stabilization effect was determined by comparing the loss of hydrogen peroxide in 24 hours at 100° C. from the compositions of the Examples below.

An aliquot of hydrogen peroxide solution (20 g.) was capped in a glass test tube and placed in a constant temperature bath. The $H_2O_2$ content was measured before and after the test as a function of its weight and concentration. Corresponding $H_2O_2$ concentrations were determined by an iodometric titration. Storage stability was calculated as the weight basis percentage of hydrogen peroxide remaining at the end of the test period relative to the initial amount. This method of calculating storage stability is described further in U.S. Pat. No. 4,981,662 to Dougherty, incorporated herein in its entirety by reference.

Example 1—Comparative Example

An aqueous solution of non-stabilized hydrogen peroxide (30%, Fisher Scientific Co.) was diluted to 28.69% with demineralized water and tested for 24 hr storage stability at 100° C., as described above. The results are reported below in Table I.

Examples 2–8—Invention Examples

To a 30% aqueous solution of non-stabilized hydrogen peroxide was added an amount of demineralized water and of phosphomolybdic acid ($H_3PMo_{12}O_{40}$ x $H_2O$ (7.31% water) Aldrich Chemical Company) to give a hydrogen peroxide concentration of 28.69% and a phosphomolybdic acid concentration as indicated in Table 1 for Examples 2–8, respectively. The samples were tested as in Example 1 and the results are reported in Table 1.

TABLE I

| Example No. | PMA, mg/L | Stability, % |
| --- | --- | --- |
| 1 | None | 73.43 |
| 2 | 5 | 91.74 |
| 3 | 10 | 90.92 |
| 4 | 50 | 89.48 |
| 5 | 200 | 89.23 |
| 6 | 500 | 89.02 |
| 7 | 1000 | 86.46 |
| 8 | 2000 | 82.91 |

The above Examples demonstrate that the addition of PMA to aqueous hydrogen peroxide solution stabilizes the solution.

In some cases the aqueous compositions of the invention may be simultaneously stabilized against degradation and provide additional catalytic activity toward certain reactions of oxidation. Consequently, the invention also relates to a method of using a stabilized hydrogen peroxide composition of the invention in reactions catalyzed by a PMA compound. Specific such reactions include reaction of 3,4,5-trimethoxytoluene to produce 2,3-dimethoxy-5-methylbenzoquinone as described in U.S. Pat. No. 4,952,712; reaction of 3-(2-hydroxy-2-propyl)phenol to produce 3-(2-hydroperoxy-2-propyl)phenol as described in U.S. Pat. No. 5,030,767; and reaction of maleate compounds to produce cis-epoxysuccinates as described in U.S. Pat. No. 5,608,089. By providing a hydrogen peroxide solution containing at least one PMA compound stabilizer, the need to add a catalyst at a later point is eliminated or reduced. The method comprises the steps of providing a reactant compound which reacts with hydrogen peroxide in a reaction which is catalyzed by a PMA compound, mixing therewith an aqueous hydrogen peroxide composition which has been stabilized with the PMA compound to produce a reaction mixture and subjecting the reaction mixture to conditions which effect said reaction.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A dilute aqueous hydrogen peroxide composition comprising
   a) hydrogen peroxide in an amount of less than 50% by weight of said composition;
   b) water; and
   c) an amount of at least one phosphomolybdic compound effective to retard the rate of decomposition of the hydrogen peroxide component selected from the group consisting of phosphomolybdic acid represented by the formula $H_3PMo_mO_x$ or $H_3PO_{4x}tMoO_{3x}dMoO_2$ wherein m is 10 to 20, (t+d) is 10 to 20, x is 34 to 65, and d is greater than or equal to 0, and partial alkali salts of phosphomolybdic acid represented by the formula $H_{3-y}M_yPMo_nO_x$ wherein n is 10 to 20, y is greater than 0 and less than 3, M is lithium, sodium, potassium, rubidium, cesium or combinations thereof, and x is 34 to 65.

2. The composition of claim 1 wherein the at least one phosphomolybdic compound is phosphomolybdic acid.

3. The composition of claim 1 comprising from about 0.1 mg/L to about 2000 mg/L of the phosphomolybdic compound.

4. The composition of claim 1 comprising from about 1 mg/L to about 500 mg/L of the phosphomolybdic compound.

5. The composition of claim 1 comprising from about 5 mg/L to about 50 mg/L of the phosphomolybdic compound.

6. The composition of claim 1 wherein $0<y\leq2.5$.

* * * * *